Oct. 31, 1933.  E. C. POWELL  1,932,986
SPLIT BAMBOO FISHING ROD
Filed May 12, 1931
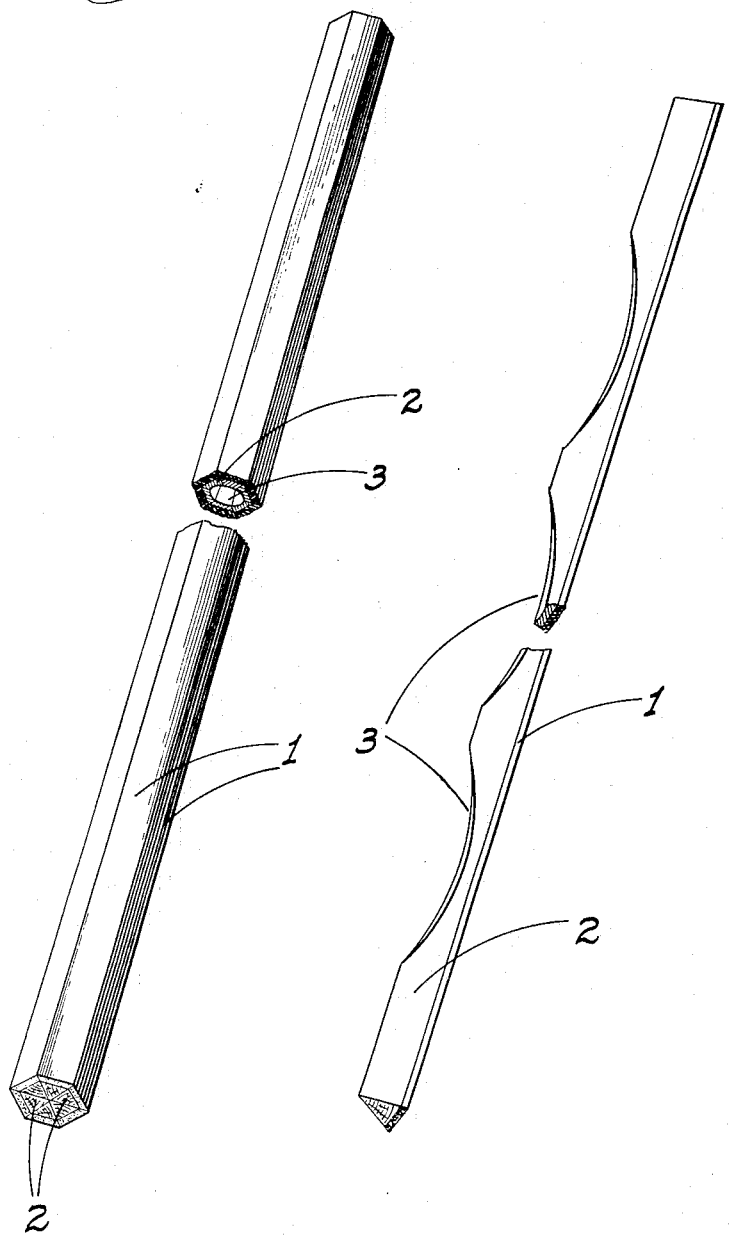
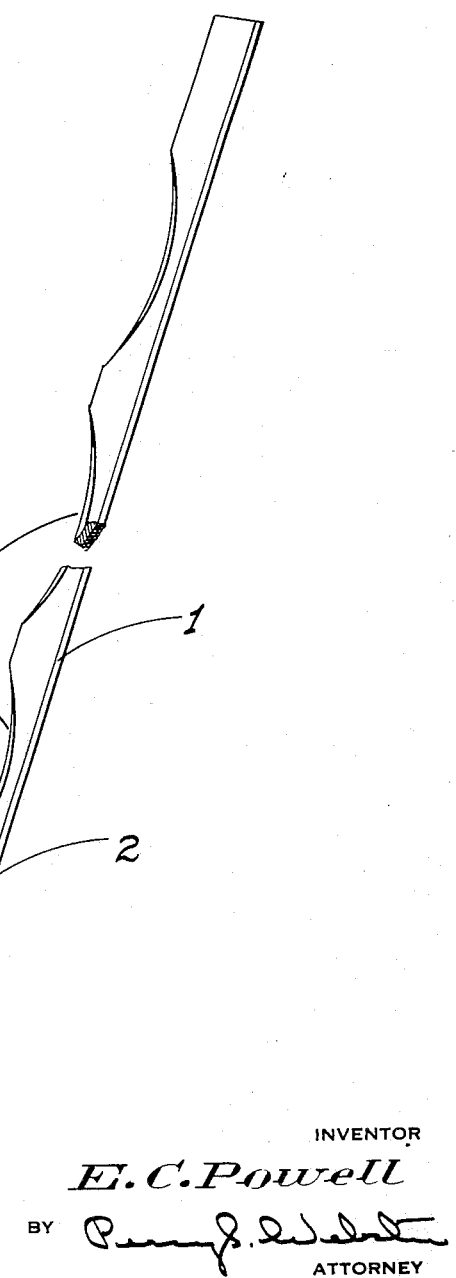
INVENTOR
*E. C. Powell*
BY
ATTORNEY Patented Oct. 31, 1933

1,932,986

UNITED STATES PATENT OFFICE 1,932,986

SPLIT BAMBOO FISHING ROD

Edwin C. Powell, Marysville, Calif.

Application May 12, 1931. Serial No. 536,735

4 Claims. (Cl. 43—18)

This invention relates to split bamboo fishing rods, my principal object being to provide a rod of this general character so constructed that the greatest possible strength relative to the weight of the rod is obtained.

I have found that bamboo, with few exceptions, grows so that the outside portion is very dense with fibres, but that these fibres gradually lessen in density until the structure becomes almost all pith. Occasionally a cane is found with a thin rind of very dense fibres that break off suddenly into pith. This latter form of growth gives the desired results as to a combination of strength and great lightness, but such canes are so few that they cannot be depended on as a source of supply for the manufacture of fishing rods. I have therefore reconstructed the bamboo so that I obtain artificially, and in any quantity, rods having a combination of strength and lightness substantially equivalent to that found in the last mentioned type of bamboo cane.

These objects I accomplish by means of such structure and relative arrangement of parts as will fully appear by a perusal of the following specification and claims.

In the drawing similar characters of reference indicate corresponding parts in the several views:

Fig. 1 is a perspective view of a section of fishing rod constructed according to my invention.

Fig. 2 is a similar view of one of the segments used in building up the rod.

Referring now more particularly to the characters of reference on the drawing, the exterior of the rod consists of a number of strips 1 of bamboo, taken from the outside and most densely fibred portion of the cane. I preferably employ six of these strips so as to form a rod of hexagonal cross section, the edges of these strips being beveled so that they abut against each other and when assembled form a hollow hexagonal tube. This hollow structure if it could be used alone, would of course give great strength, lightness and flexibility. This is not practicable however, for the reason that the gluing area of the abutting strips is insufficient to provide a good union.

I therefore fill the area of the bamboo tube with a core of light wood, which must be of a quality so that it may be firmly glued to the bamboo and to itself. Sugar pine for instance is a wood which meets the above requirements. Balsa wood, however, though extremely light, would be useless on account of it lacking strength for gluing. It would be possible to use a single piece core for the purpose, but it is desired to hollow out the core at intervals so as to lighten the same without loss of strength.

I therefore make a wooden core of as many segments 2 as there are strips 1, each such segment being thus of triangular cross section as shown. Each bamboo strip is glued to the outer face of the corresponding core segment throughout its length before the segments are assembled. In the actual construction of the rod, the strips 1 are cut to size by means of a very smooth cutting saw from pieces split from the bamboo cane. The strips are then glued onto rectangular slabs of the wood; the width of the strips and slabs being somewhat greater than that of the finished product. The glued unit when dry is then cut to the proper triangular shape necessary to make the finished segment. It is then an easy matter to gouge out the core segments at intervals between their ends as shown at 3, so as to provide the desired lightness. The various segmental units are then assembled and secured together by glue applied along the side faces of the core segments and strips.

As a result, a fishing rod of great strength and relative lightness is obtained, without any loss of the desired resiliency. It is of course to be understood that after the segments are assembled, the usual ferrules and sockets are applied to the ends of each rod section, so that the number of sections necessary to form a complete rod may be detachably connected to each other as usual. In order not to weaken the rod when the ferrules are applied, the core segments are left solid, or in other words, are not gouged out, for a distance from their ends not less than the length of the engaging portions of such ferrules.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A fishing rod comprising a number of triangular segments, each segment comprising an outer strip of fibrous material and an inner strip of different material secured to the outer strip, the inner strips being provided with cut out portions spaced along the length thereof, the segments being secured together with the cut out portions of adjacent segments registering with each other thereby forming a semihollow pole.

2. A fishing rod comprising an outer shell composed of strips of fibrous bamboo, and a core of different material from that of the shell and disposed within and cemented to the shell strips, such core being provided with cut out portions spaced along its length.

3. A fishing rod comprising an outer shell and a core of material different from that of the shell, such core being disposed within and secured to the shell, and provided with cut out portions spaced along its length.

4. A fishing rod comprising an outer shell of fibrous bamboo and a separate inner core disposed within and secured to the shell, the core being provided with cut out portions spaced along its length.

EDWIN C. POWELL.